INVENTOR.
ROBERT D. Mc NUTT
BY
Murray Nanes
ATTORNEY

Oct. 27, 1959 R. D. McNUTT 2,910,544

MAGNETIC TRANSDUCER

Filed March 18, 1954 2 Sheets-Sheet 2

INVENTOR.
ROBERT D. McNUTT

BY Murray Nanes
ATTORNEY

United States Patent Office 2,910,544

Patented Oct. 27, 1959

2,910,544

MAGNETIC TRANSDUCER

Robert D. McNutt, Poughkeepsie, N.Y., assignor to International Business Machines Corporation, New York, N.Y., a corporation of New York Application March 18, 1954, Serial No. 417,006

7 Claims. (Cl. 179—100.2)

This invention relates to magnetic transducers of the type used for recording and reproducing intelligence signals in connection with a magnetized surface of a revolving drum, such magnetic drums being conventionally used in so-called magnetic computing and magnetic storage apparatus.

More particularly this invention is directed to a magnetic transducer of unique design for use with a magnetic drum wherein the transducer is provided with a mounting so that the active magnetic element of the transducer may be suitably spaced a distance from the drum where the transducer would operate at the desired signal level.

Since modern design of magnetic drums frequently includes a thin magnetizable surface, plated or otherwise coated, upon the peripheral surface of a metal drum, irreparable damage may be caused to the drum surface if any object penetrates the magnetic surface. Resilient means have, therefore, been provided in the transducer mounting to prevent scarring of the drum surface by the accidental insertion of the transducer into the drum while the drum is stationary. This same resilient means protects the drum against scratches and abrasions due to adjusting of the transducer into the drum while the drum is revolving at its high operating speeds.

In the prior art, magnetic transducers were first set in relation to the drum and then locked into position by a locking means after the setting was made. Such transducers were subject to the likelihood that the operation of the locking means might upset the desired setting. An additional novelty in the invention is the provision of a locking means which acts constantly during the setting operation so that when the setting is completed, the transducer is already locked.

The principal object of this invention, therefore, is to provide an improved magnetic transducer which may be easily and effectively spaced from a magnetic recording surface for operation at a desired voltage level.

Another object of the invention is to provide, in a magnetic drum device, a transducer which cannot damage the magnetic surface of the drum in the event that the transducer contacts the drum surface while the drum is stationary or revolving at high speed.

A further object of the invention is the provision in a transducer of a locking means which acts to give a constant locking action during the setting of the transducer.

Still another object is the provision of a magnetic transducer which can be set in relation to a magnetic drum while said drum is rotating.

A still further object is the provision of a method of setting a transducer in relation to a rotating magnetic drum to reproduce signals at a fixed level.

Other objects of the invention will be pointed out in the following description and claims and illustrated in the accompanying drawings, which disclosed, by way of example, the principle of the invention and the best mode, which has been contemplated, of applying that principle.

Figures 1, 4:
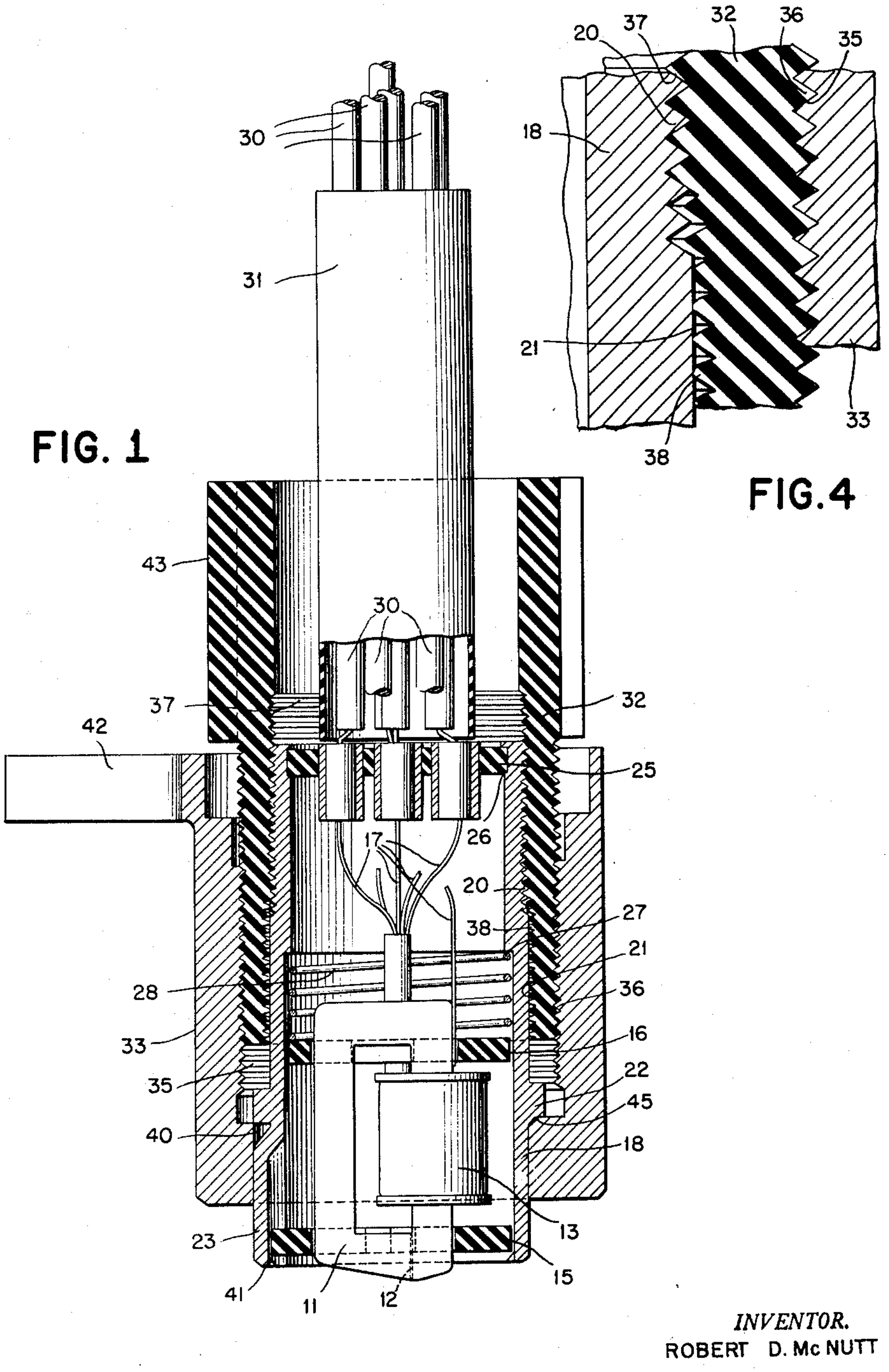
Fig. 1 is a view of the transducer fully assembled with certain portions cut away.
Fig. 4 is a detail view showing the internal and external threads of the plastic bushing of the transducer cooperating with the casing and mounting in the assembled position.
Figures 2, 3:
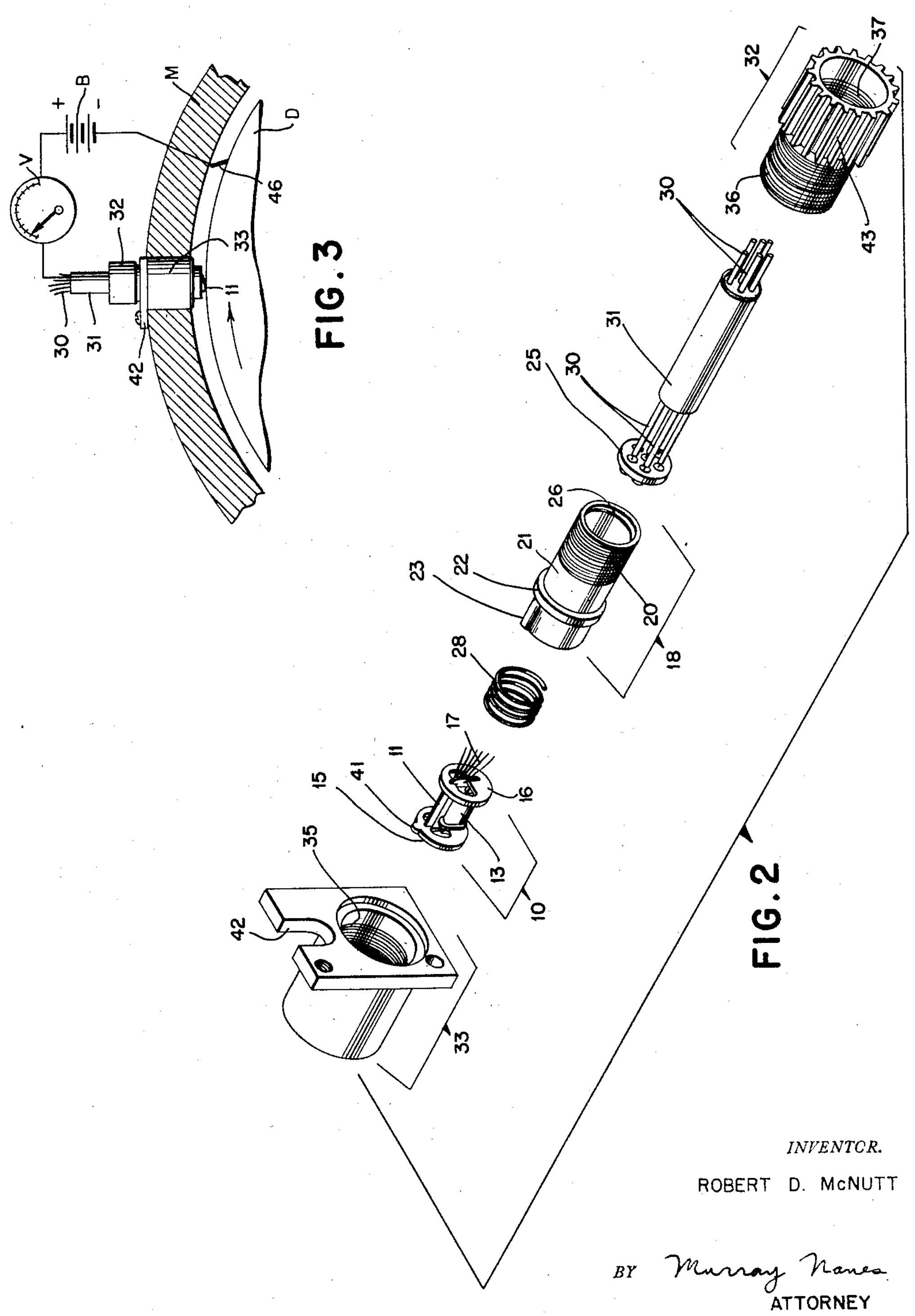
Fig. 2 is an exploded view of the transducer and its various components which make up the completed mounting.
Fig. 3 is a diagrammatic view of the transducer as mounted in cooperation with a magnetic drum.

Referring to both Figs. 1 and 2, a transducer component 10 consists of a closed core 11 having an air gap 12 for coacting with the magnetic surface of a magnetic drum. A winding 13 is loosely mounted around the core 11 which also forms the support for a bottom wafer 15 and a top wafer 16, the wafers being composed of insulating material through which pass leads 17 from the winding 13 including a lead attached to the core. A casing 18 having external threads 20, an external unthreaded portion 21, a shoulder 22, and a key 23 forms the receptacle for the transducer component 10 and also holds a terminal block 25 against an internal rim 26 of the casing 18. Between the top wafer 16 and another internal rim 27 in the casing 18, a spiral spring 28 is positioned so that the transducer component 10 and its core 11 float in the non-threaded end of the casing 18, the winding 13 being held in a fixed position by leads 17, the other ends of which are soldered to the terminal block 25. The non-threaded end of casing 18 is turned in slightly to prevent the component 10 from escaping. The threaded end of casing 18 is also turned in similarly to prevent the terminal block 25 from being pulled out of the threaded end of casing 18. This floating or spring loaded core has advantages which will be described hereinafter. Leads 30 are insulated conductors which are surrounded by a protective sheath 31 and enter terminal block 25 to form soldered connections with their respective leads 17.

The casing 18 and its components previously described are assembled within a nylon bushing 32, which, in turn, is assembled within a mounting 33 that has internal threads 35. The nylon bushing 32 has external threads 36 and internal threads 37 for a fixed length at one end, and other internal threads 38 which have the same pitch, but are of a smaller diameter for a reason to be explained hereinafter.

The internal threads 37 of the nylon bushing 32 have thirty-six threads per inch and match the threads 20 on the casing 18. The external threads 36 which have twenty-eight threads per inch match the internal threads 35 in the mounting 33. A keyway 40 internal of the mounting 33 accommodates the key 23 of the casing 18 to prevent the latter from rotating. There is also a tab 41 on the bottom wafer 15 which rides in the internal hollowed key 23 of the casing 18 to position the transducer component 10 similarly in the casing 18. The mounting 33 has a slot 42 for fastening the entire assembly to a clamping ring such as M (see Fig. 3) as will be explained hereinafter.

In assembling, the bushing 32 is threaded via its internal threads 37 to the external threads 20 of casing 18, and thereafter the casing 18 with its assembled components is fitted into the mounting 33 so that the external threads 36 of the bushing 32 engage the internal threads 35 of the mounting 33. A knurled portion 43 of the bushing 32 is turned clockwise thereafter so that the bushing 32 is translated into the mounting 33 and at the same time, since the casing 18 is prevented from rotation by its key 23 and the keyway 40, the casing 18 is translated into the bushing 32 and out of the mounting 33. However, as previously described, the threads 20 on casing 18 and the internal threads 37 of the bushing 32 have lesser pitch than the threads 36 of the bushing 32.

Turning the nylon bushing 32 in a clockwise direction will, therefore, cause the bushing 32 to move into the mounting 33 at the rate of approximately 0.036 inch per revolution because of the threads 35 and 36, which have twenty-eight threads per inch. At the same time, the casing 18 will move out of the mounting at the rate of approximately 0.028 inch per revolution because of the threads 20 and 37, which have thirty-six threads per inch. The net result of turning the bushing 32 in a clockwise direction is to cause the casing 18 to be translated into the mounting at the rate of 0.008 inch per revolution, the difference between 0.036 inch and 0.028 inch. This differential action provides the fine adjustment that is required in adjusting magnetic transducers in magnetic drum recording devices. It is obvious that a counterclockwise rotation of the bushing 32 will cause the casing 18 to be translated out of the mounting 33.

It can be observed from Fig. 1 that in assembling the threads 38 of bushing 32 will ride up over the unthreaded portion 21 of the casing 18. The threads 38 have a minor diameter of 0.496 inch which is only slightly smaller than the diameter of the casing 18 at its unthreaded portion 21 which is 0.500 inch. The smaller diametered bushing can fit over the larger diametered casing 18 only because the nylon is a yielding pastic material. The threads 38 are compressed as shown in Fig. 4 and act to hold the busing tightly against the casing 18. At the same time, the bushing 32 is pushed outward so that its external threads 36 are pressed against the threads 35 of the mounting 33. The total effect is to lock the casing 18, bushing 32 and mounting 33 relative to each other in a manner so that their relative position can be changed by manual rotation but not by any undesired or unbidden rotative forces. This provides a sort of self-locking means which acts constantly during the setting operation so that as soon as the casing 18 has been set, it is effectively locked in position.

Regardless of the positioning of the casing 18 in the mounting 33, in the manner described, the core 11 and the portion including the air gap 12 will protrude from the casing 18 (see Fig. 1), and any pressure exerted against the protruding core portion will be taken up by the spring 28, the transducer component 10 being forced into the casing 18 and the mounting 33. In this manner, if the transducer core encounters the drum surface, the drum will merely have exerted against its surface the floating transducer component 10 under the urging of the light spring 28, and damage to the drum surface will be immaterial. For further protection, an internal rim 45 is provided in the mounting 33 which will act against the shoulder 22 of the casing 18 to prevent the casing 18 at its furthermost protrusion from contacting and thereby damaging the drum surface.

In the prior art, transducers were set in relation to the magnetic drum while the drum was stationary. The setting technique consisted of inserting a shim of a predetermined thickness between each transducer and the drum, moving the transducer in until it contacted the shim and then removing the shim. This old method had the disadvantage that the drum had to be stopped to make the adjustment of the transducers, and much time was lost in stopping and restarting the drums. Since the drum was not in motion, the signal levels from each transducer could not be determined during the setting operation. Since each transducer might have a slightly different characteristic even though they were set the same distance from the drum, the signal levels might not have been the same, and this inequality had to be compensated for by external circuitry. In large drums, with many transducers, it was also very difficult to insert the shims under some of the transducers.

The subject novel transducer, which is spring loaded, makes it possible to set the transducer while the magnetic drum is rotating by eliminating the possibility for damage when the core contacts the drum.

Fig. 3 illustrates a method whereby transducers may be set in position so as to coact with a rotating magnetic drum to operate at the required signal level. Here a rotating drum D has mounting bracket M spaced from its peripheral surface to which the transducer mounting 33 is attached with the bushing 32, the sheath 31, and the leads 30 therefrom as shown. As previously mentioned, one of the leads is attached to the core 11 and is brought out through the terminal block 25 in the leads 30. A voltmeter V and a battery B are series connected to this lead and a wire is connected from the battery B through a sliding contact 46 which bears upon the surface of the magnetic drum. The bushing 32 is first adjusted by being rotated clockwise until an indication is given by the voltmeter that the core 11 is touching the drum surface. The voltmeter actually reads the voltage of the battery because of the circuit completed through the core connected lead 30, the core 11, and the drum surface D. The bushing is then rotated counterclockwise until the voltmeter no longer gives any reading, thereby indicating that the core 11 of the transducer has just left the drum surface.

For transducers which are designed alike and have the same number of turns of wire in their windings, it can be predetermined at approximately what distance the transducer must be placed from the magnetic drum to operate at the required signal level. For example, it will be assumed that a signal level of 30 milli-volts is desired, and that it has been predetermined that a 30 millivolt signal level is obtained when the core is approximately 0.002 inch from the drum. Since, as previously described, a full revolution of the bushing 32 will result in an axial translation of the core of 0.008 inch, it is obvious that a rough adjustment can then immediately be made by turning the bushing one quarter of a revolution and actual measurement of the signal level may then be taken. The output of the transducer at the leads 30 can be measured by comparing each output on an oscilloscope against the desired or standard output and then adjusting the bushing of the transducer for the desired output. A voltmeter can also be used in place of the oscilloscope to determine if the output is at the desired level.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic transducer adapted to be manually set and automatically locked in a position for recording and reproducing representations of intelligence signals from a magnetic record comprising, in combination, a core and a winding therefor, a casing embracing said core, said casing being partially threaded externally, a mounting at a fixed distance from said magnetic record, said mounting being threaded internally, and a plastic bushing threaded both internally and externally, the internal threads of the bushing being of a different pitch than the external threads of the bushing, the internal threads of the bushing cooperating with the threaded and unthreaded portions of said casing and the external threads of the bushing cooperating with the threads of said mounting whereby said core is translated differentially with respect to said mounting to the desired setting when the bushing is manually rotated, the minor diameter of the internal threads of the plastic bushing being slightly smaller than the diameter of the unthreaded portion of said casing, said casing effecting an expansion of the diameter of the plastic bushing when the threads of said bushing cooperate with the unthreaded portion of the casing, said expansion acting to lock said casing, bushing and mounting rotatable to each other against unbidden relative movement.

2. A magnetic transducer adapted to be manually set and automatically locked in a position for recording and reproducing representations of intelligence signals from a magnetic record comprising, in combination, a core and winding therefor, a casing embracing the said core and winding, said casing being partially threaded externally, a mounting internally threaded, a keyway in said mounting, a key on said casing coacting with said keyway to prevent rotation of said casing, and a plastic bushing threaded externally with a predetermined pitch to cooperate with the threads of said mounting and threaded internally with a predetermined lesser pitch to cooperate with the threaded and unthreaded portions of said casing, said casing being arranged within the bushing and said bushing being arranged within said mounting in a manner so that said core is translated in the mounting in one direction by a clockwise rotation of said bushing and in the opposite direction by a counterclockwise rotation of the bushing, the minor diameter of the internal threads of the plastic bushing being slightly smaller than the diameter of the unthreaded portion of said casing, said casing effecting an expansion of the diameter of the plastic bushing when the threads of said bushing cooperate with the unthreaded portion of the casing, said expansion acting to lock said casing, bushing and mounting relative to each other against unbidden rotative forces.

3. A magnetic transducer comprising an outer and an inner hollow cylinder, and an intermediate plastic hollow cylinder, said cylinders being concentrically arranged one within another, a magnetic core having a winding within the said inner cylinder, a portion of the core protruding from the end thereof and coacting with a magnetic recording surface, mutually cooperating threads on said outer and intermediate cylinders of a predetermined pitch, mutually cooperating threads on the inner and intermediate cylinders of lesser pitch, said threads of said intermediate cylinder adapted to ride over the unthreaded portion of said inner cylinder, the minor diameter of the internal threads of the intermediate cylinder being slightly smaller than the diameter of the unthreaded portion of said inner cylinder, said inner cylinder effecting an expansion of the diameter of the plastic intermediate cylinder when the threads of said intermediate cylinder ride over the said unthreaded portion of said intermediate cylinder, said expansion acting to lock said cylinders relative to each other against unbidden rotative forces, and means for preventing relative rotation of the said inner and outer cylinders whereby a manual rotation of the intermediate cylinder causes an axial translation of the said inner cylinder to position said core relative to said magnetic surface.

4. A magnetic transducer for use with a magnetic record, including a core and a winding, an enveloping casing within which the said core is slidably movable, restrictions in the said casing for limiting the freedom of movement of the said core to one direction in said casing, resilient means in said casing for biasing the said core opposite to said one direction to cause the core normally to partially extend from and move with the said casing, external threads on the said casing, a mounting having internal threads of greater pitch than the threads of the said casing, means for holding said winding stationary with relation to the said casing, a bushing having external threads coacting with the threads of the said mounting and having internal threads coacting with the threads of the said casing, the casing being mounted internally of the said bushing and the bushing being mounted internally of the said mounting, a keyway in said mounting, and a key on the said casing coacting with the said keyway to prevent rotation of the casing within the said mounting whereby the said casing is translated upon rotation of the said bushing to move the said core and the said winding with relation to the said mounting and the said record, said core being free to move with respect to the casing and the winding in a direction away from said restrictions and against the biasing of the resilient means when said core contacts said record.

5. In a magnetic recording device for recording and reproducing magnetic representations of intelligence signals upon a magnetic record, a transducer comprising a winding and a core slidably mounted thereon, an externally threaded sleeve for containing the core and winding including a spring continually urging the said core axially of the sleeve to extend a portion of the core to coact with the magnetic record, an internally threaded bushing meshing with the said threaded sleeve, there being external threads on the said bushing of greater pitch than its internal threads, an internally threaded mounting spaced a predetermined distance from the said record and meshing with the said external threads of the said bushing, means for holding said winding stationary with relation to said sleeve, a keyway in the said mounting, and a key on the said sleeve coacting therewith to prevent rotation of the said sleeve when the said bushing is rotated whereby the said core is moved with relation to said mounting and to and from the said record, said core being free to move with respect to the sleeve and the winding in a direction away from the said record and against the urging of the spring when said core contacts said record.

6. A magnetic transducer for use with a magnetic record, including a core and a winding, an enveloping casing within which the said core is slidably movable, restrictions in the said casing for limiting the freedom of movement of the said core to one direction in said casing, resilient means in said casing for biasing the said core opposite to said one direction to cause the core normally to partially extend from and move with the said casing, mounting for said casing, means for holding said winding stationary with relation to the said casing, and means to move the casing with respect to said mounting to move the said core and the said winding with relation to the said mounting and the said record, said core being free to move with respect to the casing and the winding in a direction away from said restrictions and against the biasing of the resilient means when said core contacts said record.

7. In a magnetic recording device for recording and reproducing magnetic representations of intelligence signals upon a magnetic record, a transducer comprising a winding and a core slidably mounted thereon, a sleeve for containing the core and winding including a spring continually urging the said core axially of the sleeve to extend a portion of the core to coact with the magnetic record, a mounting spaced a predetermined distance from the said record, means for holding said winding stationary with relation to said casing, means to move the sleeve to move the said core with relation to said mounting and to and from the said record, said core being free to move with respect to the sleeve and the winding against the biasing of the resilient means when said core contacts said record.

References Cited in the file of this patent

UNITED STATES PATENTS

| | | |
|---|---|---|
| 1,213,150 | Bullis | Jan. 23, 1917 |
| 2,144,844 | Hichman | Jan. 24, 1939 |
| 2,270,320 | Liguori | Jan. 20, 1942 |
| 2,603,682 | Uline et al. | July 15, 1952 |
| 2,644,856 | Pettus | July 7, 1953 |
| 2,708,693 | Hendrickson | May 17, 1955 |
| 2,715,654 | Lucas | Aug. 16, 1955 |

UNITED STATES PATENT OFFICE

CERTIFICATE OF CORRECTION

Patent No. 2,910,544 October 27, 1959

Robert D. McNutt

It is hereby certified that error appears in the printed specification of the above numbered patent requiring correction and that the said Letters Patent should read as corrected below.

Column 3, line 29, for "busing" read -- bushing --; column 5, line 4, for "rotatable" read -- relative --; same line 4, for "relative" read -- rotatable --.

Signed and sealed this 4th day of April 1961.

(SEAL)

Attest: ERNEST W. SWIDER

XXXXXXXXX

Attesting Officer

ARTHUR W. CROCKER

Acting Commissioner of Patents